United States Patent [19]

Frame

[11] 4,338,963

[45] Jul. 13, 1982

[54] HIGH TEMPERATURE GATE VALVE WITH FUSED SILICA BLADE

[75] Inventor: Douglas J. Frame, Pontiac, Mich.

[73] Assignee: C & H Combustion, Troy, Mich.

[21] Appl. No.: 116,178

[22] Filed: Jan. 28, 1980

[51] Int. Cl.³ .......................................... F16K 3/314
[52] U.S. Cl. ................................... 137/375; 251/368; 251/326
[58] Field of Search ............... 137/375; 251/368, 326; 501/54

[56] References Cited

U.S. PATENT DOCUMENTS

| | | | |
|---|---|---|---|
| 722,390 | 3/1903 | Spragee | 251/368 X |
| 828,280 | 8/1906 | Firey | 251/368 X |
| 1,057,717 | 4/1913 | Evans et al. | 251/368 X |
| 1,920,698 | 8/1933 | Huguenin . | |
| 2,575,464 | 11/1951 | Olsen | 137/375 |
| 3,159,377 | 12/1964 | Samour | 137/375 |
| 3,578,283 | 5/1971 | Jones . | |
| 3,701,359 | 10/1972 | Worley et al. | 137/375 |
| 3,720,229 | 3/1973 | Masson et al. | |
| 3,837,356 | 9/1974 | Selep et al. | |
| 3,916,949 | 11/1975 | Armstrong . | |
| 3,976,094 | 8/1976 | Jandrasi et al. | 137/375 |

FOREIGN PATENT DOCUMENTS

| | | | |
|---|---|---|---|
| 2804595 | 9/1979 | Fed. Rep. of Germany | 251/326 |
| 157096 | 6/1978 | Netherlands . | |
| 617408 | 7/1978 | U.S.S.R. | 501/54 |

Primary Examiner—Arnold Rosenthal
Attorney, Agent, or Firm—Krass, Young & Schivley

[57] ABSTRACT

A gate valve for controlling the flow of high temperature fluids includes a housing having an opening defining an inlet and an outlet for the fluid. An annular collar surrounding the opening includes a transverse passageway therein. The blade for controlling the fluid flow through the opening is made of fused silica. An actuator mechanism coupled to the blade moves the blade in the collar passageway to control the fluid flow through the opening. The fused silica blade exhibits superior mechanical characteristics, can be readily made in large sizes, and minimizes valve leakage.

9 Claims, 3 Drawing Figures

U.S. Patent
Jul. 13, 1982
4,338,963
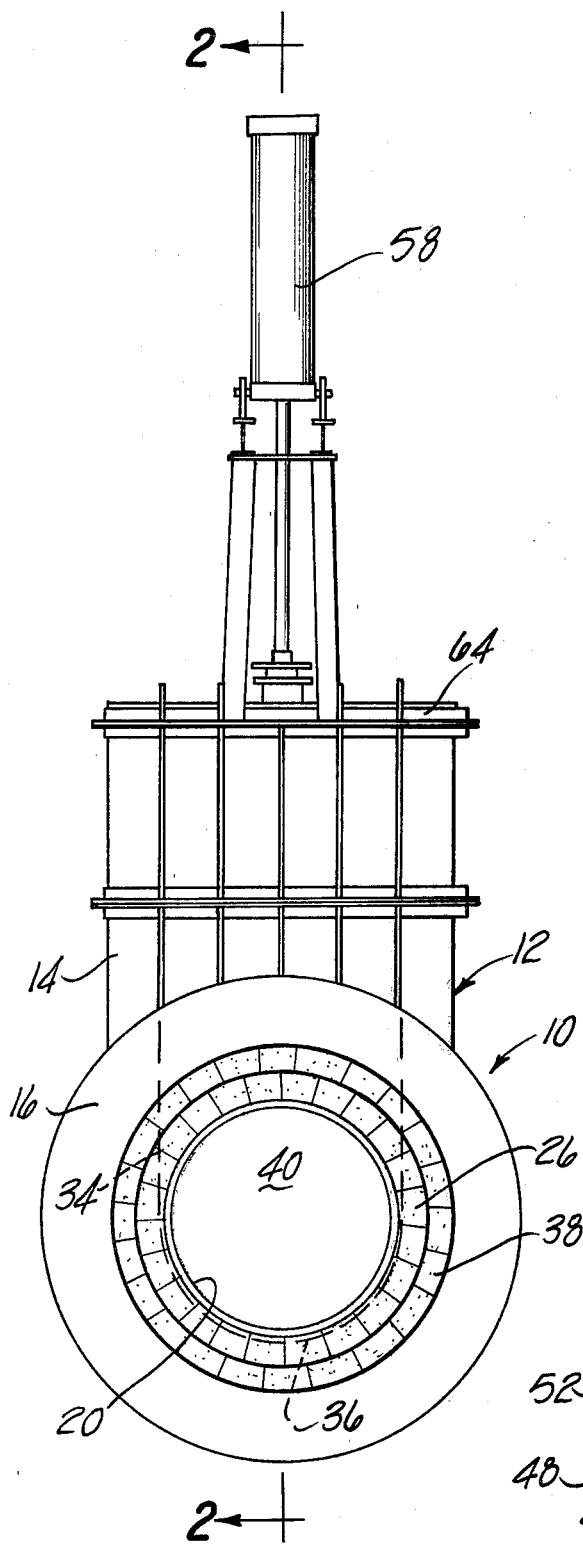
Fig-1
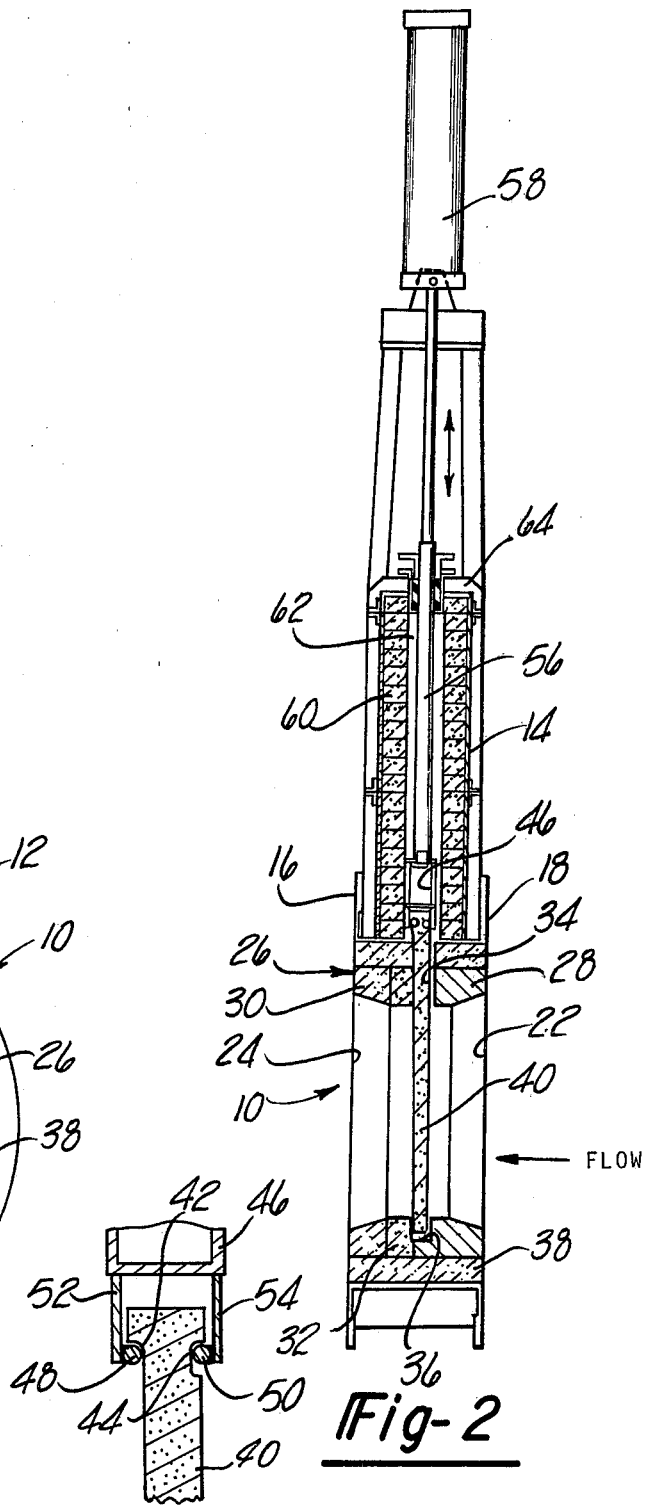
Fig-3
Fig-2

HIGH TEMPERATURE GATE VALVE WITH FUSED SILICA BLADE

BACKGROUND OF THE INVENTION

This invention relates to valves and more particularly, to gate valves for controlling the flow of high temperature fluids.

There are many applications in which it is necessary to precisely control the flow of high temperature fluids. In one particular application, it is necessary to selectively block fluid flow of high temperature methane gas between the reactor and incinerator in the production of thermal black. Metal valving elements have been used in the past in these types of applications. However, they are subject to corrosion, errosion, and warpage which reduces the ability of a valve to properly control the gases. Water cooling systems have been used in an attempt to minimize these undesirable characteristics but in general they have been troublesome and greatly increase the operating cost of the valve.

In one attempt to solve this problem, the prior art attempted to utilize silicon carbide refractory material for the valve element. In U.S. Pat. No. 3,837,356 there is disclosed a "goggle" type valve in which a pivotally movable gate member is sandwiched between two stationary goggle-type sections. Goggle valves such as the one disclosed in this patent have several disadvantages. For example, the gate member must be at least twice as large as the fluid flow opening in the valve. Because of the relatively complex housing and actuating mechanism in this goggle valve, the gate member was, for all practical purposes, restricted to a relatively small size, typically, about 6 to 12 inches in diameter.

Despite all of its disadvantages, those skilled in the art believe that the goggle-type valve was the only practical construction for utilizing relatively fragile refractory material for the gate member since the goggle valve provided support for the sliding gate member over a substantial area. This patent teaches that silicon carbide provides a gate member which is relatively durable, errosion resistant and capable of withstanding thermal shock. It has been discovered that silicon carbide when used in very demanding applications, such as the one noted above, still does not possess the necessary characteristics. In actual use, it has been discovered that silicon carbide can deteriorate within a relatively short period of time and permit an unacceptable amount of leakage when the valve is supposedly closed. Moreover, it is difficult, if not impossible, to readily construct gate valves much in excess of 24 inches from silicon carbide without experiencing an untolerable level of cracks and other properties which would render it unacceptable in use.

SUMMARY OF THE INVENTION

The present invention is directed to a gate valve, preferably of the guillotine-type, which can be made relatively inexpensively in comparison with the goggle-type valve and yet still provide even better performance characteristics in very demanding environments. In its broadest aspects, the present invention is directed to the discovery that a blade for a guillotine-type gate valve made of relatively pure fused silica provides superior operating characteristics over any high temperature gate valve previously known in the industry. The fused silica blade is relatively easily manufactured in a one-piece construction, without cracks, for lengths up to six feet and thicknesses of in excess of three inches. The mechanical characteristics of such a blade are so superior that it may be used in a relatively simple guillotine-type gate valve yet provide extreme resistance to leakage.

Preferably, the gate valve of the present invention includes a housing, and an opening defining an inlet and outlet for the fluid flow. An annular inner collar includes a transverse passageway therein for guiding the blade into seating engagement with a groove in lower portions of the collar. Actuator means coupled to the blade controls the degree of blade closure of the opening.

One feature of the present invention includes a tapered inlet in the annular collar to provide a venturi effect for increasing the fluid velocity over the valve seat when it is open to thereby scrub the valve seat and keep it clean. The actuator means is conveniently coupled to the blade, according to still another feature of this invention, by the means of a yoke having opposed spaced rods which slidably engage corresponding channels in top portions of the blade.

BRIEF DESCRIPTION OF THE DRAWINGS

These and other advantages of the present invention will become apparent upon reading the following specification and by reference to the drawings in which:

FIG. 1 is a plan view of one embodiment of the gate valve of the present invention;

FIG. 2 is a cross-sectional view of along the lines 2—2 of FIG. 1; and

FIG. 3 is an enlarged partial view of the blade interconnection device.

DESCRIPTION OF THE PREFERRED EMBODIMENT

Turning now to the drawings, the preferred embodiment of the invention is shown in connection with a guillotine-type gate valve 10 having a housing 12. Housing 12 includes a metallic outer covering defining bonnet 14 and two opposing annular face plates 16 and 18. Housing 12 further includes an opening 20 defining an inlet 22 and outlet 24 for valve 10. In this particular embodiment, opening 20 is about three feet in diameter.

An inner annular collar 26 surrounds opening 20. Collar 26 includes opposing outer layers 28, 30, of dense, hard firebrick such as that manufactured by A. P. Green Company under the mark "Clipper". Layer 28 is made of a plurality of firebricks which are tapered from inlet 22 and converge towards outlet 24. Similarly, the firebricks of layer 30 diverge from inlet 22 to outlet 24. Intermediate portions of inner collar 26 include an annular insert 32 of silicon carbide which is disposed adjacent the outlet side of blade 40. Upper and side portions of firebrick layer 28 include a transverse passageway 34 which terminates in a generally U-shaped groove 36 in lower portions thereof.

An outer collar 38 similarly includes a transverse slot therein on upper and side portions thereof to complete passageway 34. Outer collar 38, in this embodiment, is made of a plurality of relatively soft, porous insulating firebricks such as Nos. G - 23 from A. P. Green Company.

Special attention is now drawn to blade 40. Blade 40 is made of fused silica ($SiO_2$). For purposes of this invention the term "fused silica" shall mean a material consisting of at least 95% pure silicon dioxide which has been formed in its final shape by firing. In the preferred embodiment, blade 40 consists of 99.6% silica ($SiO_2$), 0.2% alumina ($Al_2O_3$), 0.03% iron oxide ($Fe_2O_3$), about 0.03% lime (CaO) and magnesia (MgO), and about 0.02% alkalies ($Na_2O$, $K_2O$). The fused silica per se is commercially available from Harbison-Walker Refractories of Pittsburgh, Pennsylvania under the mark "Masrock". Preferably, the blade is formed by a method known in the art as slip casting which provides the "skin" of the blade 40 with dense, close knit, strong, and smooth characteristics. Blade 40, in this example, is generally rectangular being about 54 inches long, 42 inches in width and about 3 inches thick. It should be noted that a wide variety of different shapes for blade 40 can be made from the fused silica.

As can be seen most clearly in FIG. 3, the upper portions of blade 40 include generally horizontally lips or channels 42 and 44. Yoke 46 includes generally horizontally extending rods 48 and 50 which are suspended from yoke 46 by struts 52 and 54, respectively. Yoke 46 is suspended from link 56 which, in turn, is coupled to actuator mechanism 58. Actuator 58 is an air or hydraulic cylinder which affects the reciprocal up and down movement of blade 40 to thereby control the amount of fluid flow through gate valve opening 20. The particular design of the blade interconnection device permit the blade channels to be slipped into engagement with the yoke gripping rods to connect the blade 40 to the actuator 58 without the necessity of drilling holes through the refractory blade 40. Accordingly, any possibility of damaging the blade 40 is minimized, and possible stress concentration at the holes is eliminated.

Gate valve 10 is completed by way of an insulating firebrick liner 60 disposed between chamber 62 and the outer metallic sheet of bonnet 14. A removable cover 64 permits blade replacement when necessary.

In operation, gate valve 10 is inserted at the proper location and mounted in the fluid containing conduit, for example, by bolting face plates 16 and 18 thereto. The amount of fluid flow through valve 10 is controlled by the degree that blade 40 is inserted into opening 20. Passageway 34 guides the valve such that, when in the fully closed position as shown in the drawings, the tip of blade 40 comes to rest in groove 36. When seated, blade 40 is pressed against silicon carbide insert 32 by the fluid flow. To open valve 10, actuator mechanism 58 retracts the blade into chamber 62 of bonnet 14. Various positions between the fully opened and fully closed positions can readily be obtained. When blade 40 is retracted, the shape of the inner collar 26 causes a venturi effect such that the velocity of the fluid flow as it passes through opening 20 is increased. Consequently, the turbulent fluid flow provides a scrubbing action for cleaning the groove 36 which acts as a seat for blade 40.

The present invention finds particular utility in high temperature, corrosive environments. By way of experimentation, it has been shown that the gate valve of the present invention exhibits less than about 1% leakage at a pressure of about 2 lbs. per square inch at temperatures of about 2,200° F., with the fluid being "cracked" methane gas as is used in the production of thermal black. Moreover, the valve of the present invention has proven to withstand the thermal shock created by cycling from a fully closed to fully open position every five minutes, with the withdrawal rate between the two positions being about 5 to 10 seconds. In such an environment, there is about 500° F. differential between the temperature encountered by blade 40 between the fully closed and fully opened position. Despite these demanding conditions, the gate valve of the present invention still maintains the minimal leakage noted above. It is envisioned that those skilled in the art will find many other applications for the use of fused silica to control the flow of high temperature gases, generally in excess of 1,600° F.

It has also been determined that a blade made of silicon carbide does not provide this superior sealing property and, in fact, deteriorates to an unusable condition after a relatively short time. Also, it was found that it was extremely difficult to manufacture silicon carbide blades in the large sizes noted above. The excellent mechanical properties of the fused silica blade of the present invention enables one to manufacture a relatively simple guillotine-type gate valve disclosed herein. However, the fused silica blade could also be used in other types of valving arrangements if desired.

Therefore, while this invention has been described in connection with particular examples thereof, no limitation is intended thereby except as defined in the appended claims.

The embodiments of the invention in which an exclusive property or privilege is claimed are defined as follows:

1. In a valve for controlling the flow of high temperature fluids, the improvement comprising:
    a housing having an opening defining an inlet and an outlet for the fluid;
    an inner annular collar surrounding the opening and having a transverse passageway therein;
    a blade made of fused silica consisting of at least 95% pure silicon dioxide;
    actuator means coupled to said blade, operative to move the blade in said passageway to control fluid flow through the opening; and
    wherein said collar is made of refractory material and includes a silicon carbide insert adjacent the outlet side of said blade, operative to contact said blade when said valve is closed.

2. The improvement of claim 1 wherein said blade is made of a one piece construction.

3. The improvement of claim 1 wherein said valve further comprises a bonnet adjacent said collar, said actuator means operative for retracting said blade into the bonnet to open the valve.

4. The improvement of claim 3 wherein said bonnet is disposed in a generally vertical orientation and wherein said passageway terminates in a groove in the collar for receiving end portions of the blade.

5. The improvement of claim 1 which further comprises an outer collar made of a refractory different from that of the inner collar.

6. The improvement of claim 1 wherein said valve further comprises:
    a liner of insulating refractory material in the bonnet.

7. The improvement of claim 6 wherein said inner collar is tapered to provide a venturi effect for increasing the velocity of fluid flow over the groove to thereby clean the same when the valve is at least partially open.

8. The improvement of claim 1 wherein upper portions of the blade include opposing channels, with the actuating means including a yoke having a gripping means for sliding engagement with said channels, said yoke being connected to the actuator means whereby said blade is mounted for movement without drilling holes therein.

9. The improvement of claim 1 wherein said blade is in excess of 24 inches in at least one direction.

* * * * *